United States Patent [19]

Ferrentino et al.

[11] 4,050,867
[45] Sept. 27, 1977

[54] EXTRUSION HEAD FOR EXTRUDING PLASTOMERIC OR ELASTOMERIC MATERIAL ON FILAMENTS

[75] Inventors: Antonio Ferrentino, Monza (Milan); Antonio Brovedan, Milan; Angelo Sala, Merate, all of Italy

[73] Assignee: Industrie Pirelli Societa per Azioni, Milan, Italy

[21] Appl. No.: 641,980

[22] Filed: Dec. 18, 1975

[30] Foreign Application Priority Data

Dec. 20, 1974 Italy ................................. 30785/74

[51] Int. Cl.² .............................................. B29F 3/10
[52] U.S. Cl. ................................. 425/114; 264/174; 425/376 R; 425/461
[58] Field of Search ............... 425/113, 114, 380, 467, 425/376, 461; 264/174; 156/51, 244

[56] References Cited

U.S. PATENT DOCUMENTS

| 326,021 | 9/1885 | Cruickshank | 156/51 |
|---|---|---|---|
| 2,488,576 | 11/1949 | Berggren | 425/114 |
| 2,659,932 | 11/1953 | McNamee | 425/114 |
| 2,766,481 | 10/1956 | Henning | 425/817 |

Primary Examiner—Francis S. Husar
Assistant Examiner—Mark Rosenbaum
Attorney, Agent, or Firm—Brooks, Haidt, Haffner & Delahunty

[57] ABSTRACT

An extrusion head for extruding a plastomeric or elastomeric material on at least two filaments having a diameter of the order of 0.1 mm. and having a high modulus of elasticity while maintaining a constant spacing between the filaments and a process for such extrusion. The head comprises a mandrel with a cylindrical portion and a frusto-conical portion, the mandrel having grooves equal in number to the number of filaments extending along the surfaces of both portions for guiding the filaments. The frusto-conical portion has channels between the grooves for feeding the material between the filaments. A die with an opening having parallel walls for guiding the filaments and having a conical surface spaced from the frusto-conical portion is mounted adjacent the latter to provide a space for flow of the material. A further element adjacent the die may be used to extrude further material over the filaments embedded in the material extruded therebetween.

9 Claims, 4 Drawing Figures

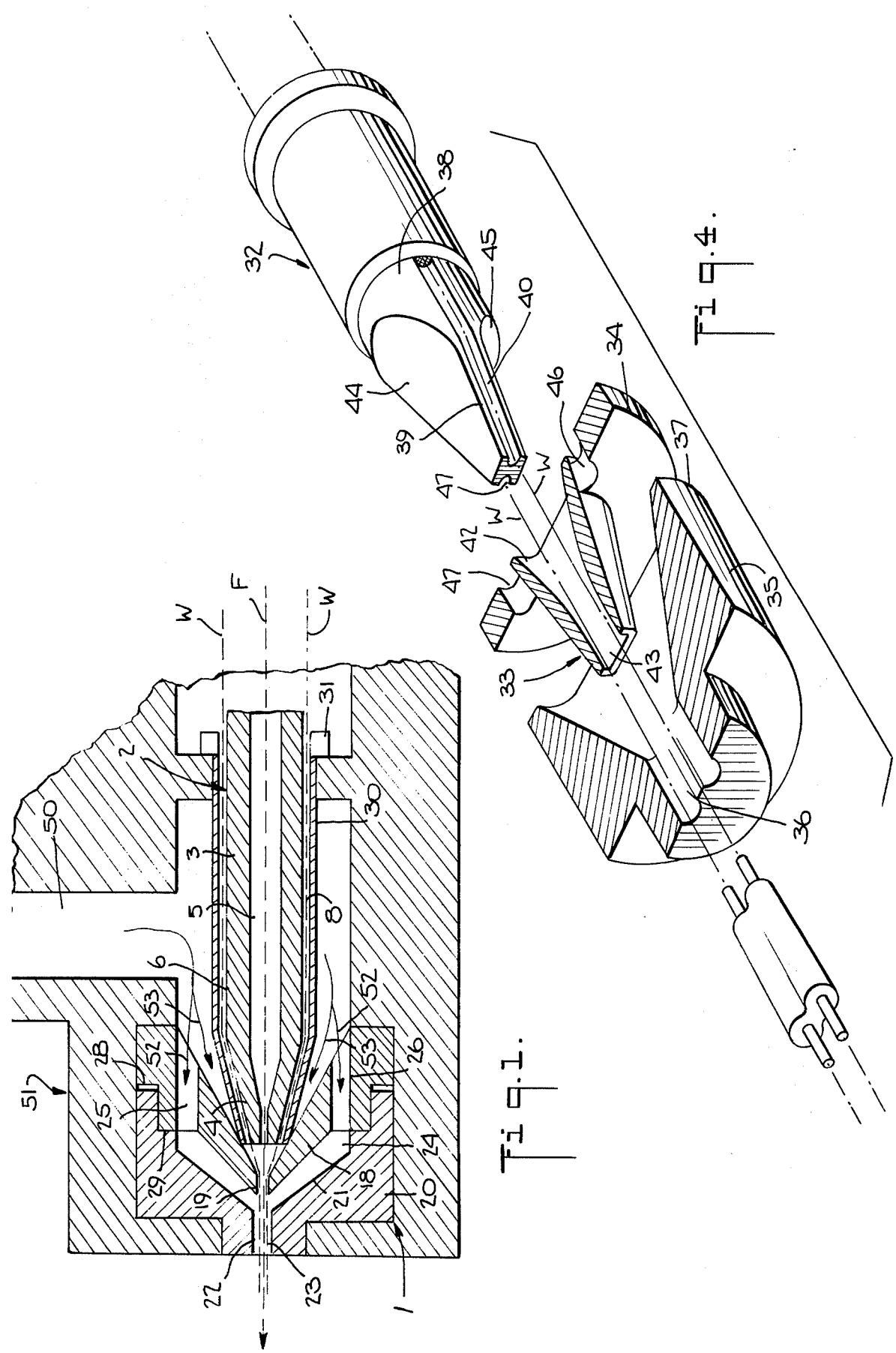

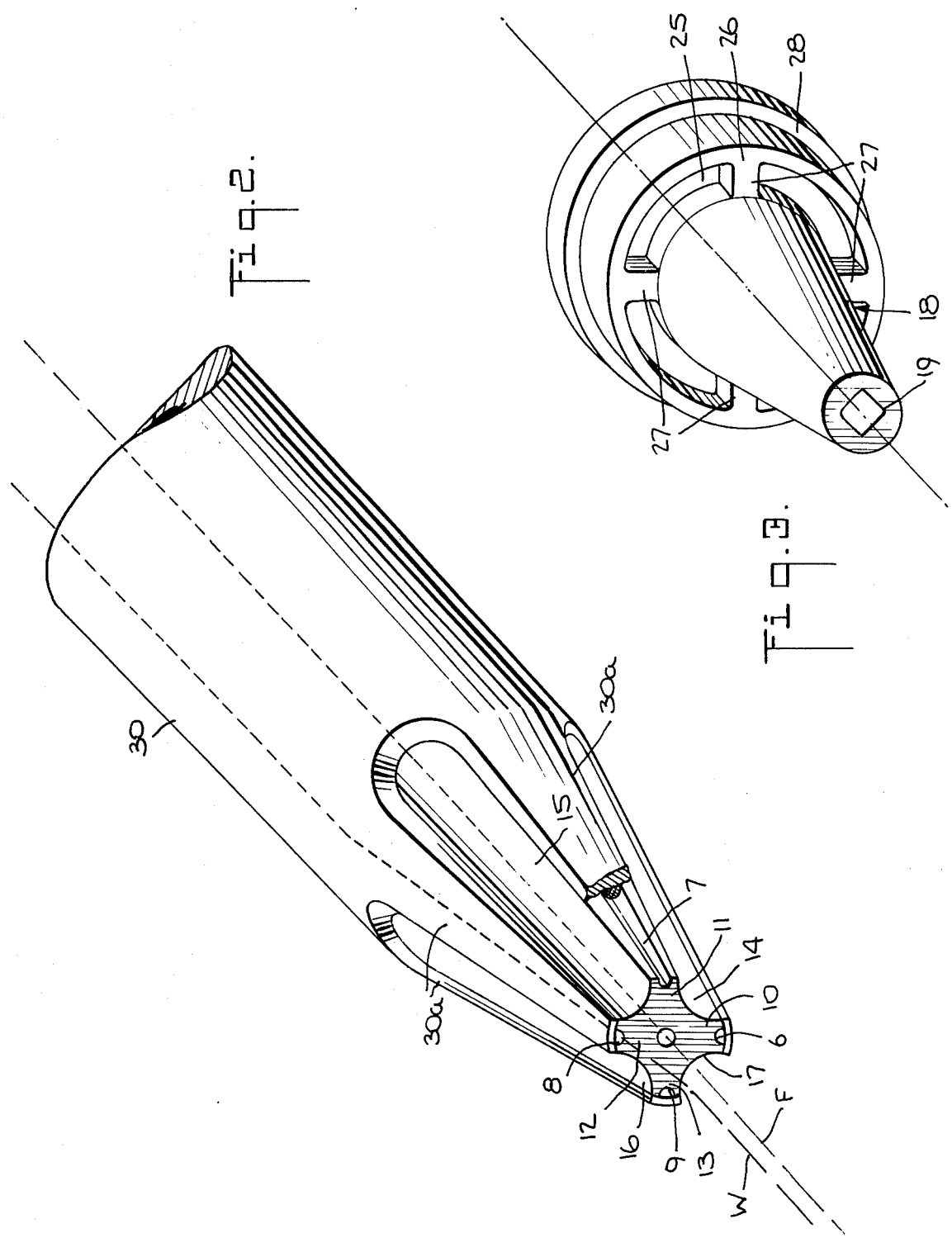

EXTRUSION HEAD FOR EXTRUDING PLASTOMERIC OR ELASTOMERIC MATERIAL ON FILAMENTS

The invention relates to an extrusion head for extruding a plastomeric or elastomeric material on filaments, and particularly, for extruding such material around at least two filaments having a transversal dimension of the order of magnitude of 0.1 mm., and made of a material having a modulus of elasticity greater than 4,000 kg/mm$^2$.

Extrusion heads for extruding plastic material around reinforcing materials, such as iron wires or the like, are already known. For the most part, said extruders comprise one or more flow passageways for the plastomeric or elastomeric material which are directed towards the extrusion head to which the reinforcing wires are also fed and progressively enclosed by the covering material.

Unfortunately, the extrusion heads known up to the present time do not ensure, during extrusion, a constant distance between the filaments, as, for example, may be required between the wires constituting the pairs of a telephone cable. It is, in fact, known that in cables of this type variations of the distance between the wires may cause corresponding modifications in the values of electrical capacitance thereof, with the consequence that the electric characteristics necessary in the cable service are adversely affected.

Another type of article which cannot be obtained by means of the conventional extrusion heads is a telecommunication cable comprising an optical fiber enclosed in a plastic support. As described in co-pending applications Ser. Nos. 468,765 and 598,753, filed May 10, 1974 and July 25, 1975, respectively, and assigned to the assignee of this application, said optical fibers can be satisfactorily employed as a means for transmitting signals in a telecommunication cable when they are appropriately protected by wires adjacent thereto and intended to absorb the mechanical stresses exerted on the fiber during the cable manufacture and laying.

It is apparent that the wires provided to protect the optical fiber along its whole length exert a significant absorption of said mechanical stresses only if the wires are arranged in an orderly and symmetrical manner with respect to the fiber itself. In fact, in such condition, the optical fiber is disposed at the neutral axis of the resistance section defined by the protective covering and would not be subjected to such compression and tension stresses as to compromise its operation in telecommunication cables. Therefore, it can be readily understood that in the field of manufacture of telecommunication cables with optical fibers, it is necessary to use apparatus able to maintain the desired distance between the protecting wires during their embedding in the plastic material forming their support. Unfortunately, as mentioned hereinbefore, the conventional extrusion heads known in the art up to the present time are unable to ensure such a result.

One object of the present invention is to provide an extrusion head for making cables of the type described hereinbefore in which the filaments are uniformly spaced.

The main object of the present invention is an extrusion head for extruding plastomeric or elastomeric material around at least two filaments of a material having a modulus of elasticity greater than 4,000 kg/mm$^2$, such extrusion head comprising a mandrel, means for guiding the filaments arranged in separate relationship during the mandrel, and means for directing the flow of the plastic material interposed between said guiding means.

The advantage of the extrusion head of the invention is particularly evident in the hereinbefore mentioned applications, namely, where it is necessary to maintain a constant distance between the filaments when the latter are progressively enclosed in the plastomeric or elastomeric material, the mass of which would tend to separate the filaments. Said constant distance can be achieved by providing guiding means arranged in spaced relationship along the mandrel in such a way as to bring the filaments into the desired position at the time of extrusion, thus opposing approach of the filaments to each other which may be caused by the flow of a fluid mass which is difficult to control.

Obviously, if it is desirable to have an arrangement in which the filaments are symmetrical with respect to the central axis of the extruded product, the invention, according to a preferred embodiment, provides guiding means situated at equal distance with respect to the mandrel axis.

Moreover, if it is desired to obtain a product in which, for example, at least two filaments having high mechanical characteristics are provided to protect a filiform element having inferior mechanical characteristics, a further alternative embodiment of the invention comprises a mandrel which includes, for its entire length, a duct for the passage of a further filament and the axis of said duct is coincident with that of the mandrel.

It will be clear from the description of the embodiment of the invention set forth hereinafter that such embodiment permits the manufacture of articles impossible to manufacture prior to the present time, namely, the inclusion of an optical fiber and of protecting filaments into a unitary plastic material without varying the distances between the fiber and the protecting or reinforcing filaments.

In a further embodiment, the extrusion head, intended to enclose at least two wires in plastic material, comprises a mandrel having a first portion of constant transverse size followed by a second portion having a decreasing transverse size. By virtue of this geometrical configuration of the mandrel, the wires or filaments pass from a portion where they are subjected to an axial tension force to a portion where they, by changing directions approximately inclined with respect to the preceding directions, are subjected to components of forces in radial direction. Such latter forces press the wires closely to said second portion along pre-established planes, and this permits, advantageously, the maintenance of predetermined distances between the filaments. Preferably, the first portion of the mandrel is of cylindrical section, and the second portion is of frusto-conical section.

With respect to the preferred embodiment of the guiding means, the extrusion head comprises guiding grooves between the walls at one end of the second portion of the mandrel, and the flow directing means comprises flow channels for the plastomeric or elastomeric material defined by said walls.

With the extrusion head of the invention, the plastic material which is supplied from a conventional source thereof, not only does not interfere with the filaments, which are compelled by the forces to which they are subjected in the frusto-conical portion to travel in the grooves, but also is restricted by the channels in the walls to flow in the free spaces between the filaments, so that the filaments are embedded in the plastic material at the desired, pre-established distances.

Further, the aforementioned extrusion head is characterized in that it comprises a tip of hollow conical shape provided with a central duct and arranged co-axially with the frusto-conical surface of the mandrel to provide a free space intended for the passage of filaments and of the plastomeric or elastomeric material, said tip being intended to guide the filaments in close contact with the duct and with the plastomeric or elastomeric material between the filaments.

The presence of the tip contributes advantageously to an ordered embedding of the filaments in the plastic material, because the filaments exiting from the mandrel are compelled by the mechanical tension stresses to which they are subjected to converge towards the central duct of the tip, on the contour of which they press with close adherence. In fact, in the passage from the conical surface of the tip to its duct surface, components of the tension forces are produced which push the filaments towards the walls which delimit the central duct, so that the desired distances between the filaments are maintained and are then fixed in a permanent condition by the flow of the plastic material.

In a further embodiment, the extrusion head of the present invention is characterized in that it comprises an element having a conical inner surface followed by a cylindrical surface, having a central hole with a diameter greater than the duct of the tip, the element having a conical inner surface extending around the tip for the passage of additional plastomeric or elastomeric material on the filaments exiting from the central duct of the tip and the tip and the element being aligned with the mandrel. Said element, in association with the tip, provides a further path of flow for the plastic material, permitting the fixing of the distance between the filaments.

The product exiting from the central hole of the tip comprises filaments arranged on the exterior of the plastic material, and the product exiting from the element preferably is provided with a further covering layer formed by the feeding of plastic material between the tip and the element, which layer prevents displacement of the filaments in the radial direction.

A further object of the present invention is a process carried out by means of the extrusion head according to the various embodiments, said process comprising the steps of causing the filaments to advance on the mandrel, applying forces to maintain the filaments in contact with the mandrel along pre-established planes, applying further forces to the filaments exiting from the mandrel to impart to them pre-established directions and supplying plastic material between the filaments.

It can be appreciated that the hereinbefore mentioned process offers considerable economical advantages with respect to other manufacturing systems, in which it is necessary to carry out several working phases with different machines, for example, the preparation and the thermal treatment of a support of plastomeric or elastomeric material, the successive insertion of reinforcing filaments in said support, and then further covering with another embedding material. Said working steps are reduced in the process according to the present invention by using an extrusion step carried out with a single machine.

Other objects and advantages of the present invention will be apparent to those skilled in the art from the following description of presently preferred embodiments thereof, which description should be considered in conjunction with the accompanying drawings in which:

FIG. 1 is a longitudinal sectional view of the extrusion head of the invention;

FIG. 2 is a perspective view of the mandrel of the extrusion head shown in FIG. 1;

FIG. 3 is a perspective view of the tip situated at the end of the mandrel; and

FIG. 4 is an exploded, perspective view, partly in cross-section, of a modified extrusion head for embedding two filaments in plastic material.

The extrusion head of the present invention is particularly suitable for the extrusion of plastomeric or elastomeric material around at least two filaments having a transversal dimension of the order of magnitude of 0.1 mm. and made of a material having a modulus of elasticity higher than 4,000 kg/mm$^2$.

The main feature of said extrusion head is that it comprises a mandrel, guiding means on the mandrel to keep the filaments separated and subjected to a mechanical dragging force, and means for the admission of the plastic material interposed between the guiding means. According to the desired distance between the filaments, said guiding means can be arranged in several ways and may, for example, be arranged symmetrically with respect to the mandrel axis.

The extrusion head can also comprise, at its inside and along the mandrel, a duct permitting the passage of a further filament. In some cases, said duct may have an axis coincident with that of the mandrel, for example, when it is desired to embed in plastic material several filaments, the central one of which has low mechanical characteristics with respect to the outermost ones intended to act as protecting filaments.

The invention will be better understood from a consideration of the embodiment illustrated in FIGS. 1-3 which illustrate an extrusion head used to extrude plastomeric or elastomeric material so as to embed an optical fiber and four protecting metal wires having high mechanical characteristics with respect to the fiber, the resulting product being similar to the product shown in FIG. 2 of said application Ser. No. 598,753.

The extrusion head (FIG. 1) comprises a mandrel 2 with a first portion 3 of cylindrical section followed by a second portion 4 of frusto-conical section. The mandrel 2 has, at its center and for its whole length, a duct 5 for the passage of an optical fiber (indicated by the dotted lines F) and has grooves 6, 7, 8, 9 (FIG. 2) on said mandrel 2 for separately guiding four wires (indicated by the dotted lines W) subjected to mechanical tension applied from the outside of the head 1 in any conventional manner.

On the first portion 3 of the mandrel 2, the grooves 6-9 extend in a direction parallel to the axis of the first portion 3, and then, on the second portion 4 of the grooves 6-9 converge toward the central axis of the second portion 4. The grooves 6-9 are formed on the outer surfaces of walls 10, 11, 12, 13 which are spaced in the direction peripherally of the axis of the mandrel 2. The dimension of the outlet hole of the duct 5 and the depth of the grooves 6-9 is of the same order of magnitude, respectively, as the dimension of the otpical fiber F and as the dimension of the protecting wires W used, namely, slightly greater than 0.1 mm. in the usual case.

The means for the flow of the plastic material coming from an appropriate tank (not shown but connected to the duct 50) comprises channels 14, 15, 16, 17 (FIG. 2) interposed between the walls 10–13 of the guiding means in the terminal part of the mandrel 2.

Said channels 14–17, as shown in FIG. 2, are appropriately situated to order to convey the flow of plastic material exiting from the mandrel into the free space between the fiber F and the wires W.

The extrusion head comprises, moreover, a die 18 (FIGS. 1–3) of conical shape, with a central duct 19 having a diameter greater than the diameter of the end of the duct 5, and a square end section to allow the passage of the optical fiber F at the center and of the four filaments or wires W in contact with the vertices of said square section.

Said die 18 has its conical surface co-axial with the mandrel 2 in a manner which will provide a free space between it and the frusto-conical surface of the mandrel 2. In the example illustrated in FIG. 1, the die 18 has an inner conical surface with a generatrix having an angle of inclination greater than that of the generatrix of the frusto-conical portion 4 of the mandrel 2, and is disposed in abutting relationship to the end of the mandrel 2, a zone of the inner conical surface of the die 18 engaging the end of the mandrel 2.

Said position of the die 18, which has its inner surface in contact with the walls of the channels 14–17 on the mandrel 2, provides a reduction in the section of the flow channels and facilitates the conveyance of the plastic material through the duct 19 in the space between the fiber F and the wires W.

The extrusion head comprises a further element 20 (FIG. 1) having a conical inner surface 21 and then a cylindrical inner surface 22 surrounding a hole 23.

The cylindrical portion 22 of said element 20 has, for its whole length, a diameter greater than that of the duct 19 in order to allow, besides the passage of the plastic material which has already extruded around the fiber F and the wires W, the extrusion of a further covering layer. To allow feeding of plastic material for the further layer, the conical surface 21 of the element 20 is spaced from and extends around the conical die 18 so as to create a space 24 to receive plastic material from the feeding tank. In the example of FIG. 1, said space 24 receives the flow of plastic material coming from the tank by way of flow apertures 25 bounded by a circular jacket 26 associated with the outer surface of the die 18 by means of spokes 27 (FIG. 3).

In a preferred embodiment, the die 18 comprises a circular flange 28 (FIG. 3) extending above the jacket 26 and the element 20 comprises a circular seat 29 (FIG. 2) inside the element 20 to receive the flange 28 in abutting relationship. The various parts are maintained in assembled relation by a housing 51 extending around the mandrel 2, the die 18 and the element 20, the housing 51 having the duct 50 for supplying the plastic material which flows around the mandrel 2 and follows the paths indicated by the arrows 52 and 53. The housing 51 may be a conventional longitudinally split housing.

To complete the description of the extrusion head, means is provided to maintain the filaments or wires W along the guiding means of the mandrel 2. Said means can be of different types. For example, it can comprise a particular shape of the grooves 6–9, able to prevent the wires from coming out or, as indicated in FIGS. 1 and 2, the grooves 6–9 can be closed by a sleeve 30 having an inner diameter substantially equal to that of the mandrel 2 and extending around the cylindrical portion 3 of the latter. Said sleeve 30 also has fingers 30a which extend over the terminal portion 4 of the mandrel 2 and above the grooves 6–9 leaving openings at the channels 14–17.

With respect to the assembly of the extruder components and their preparation for use, the following procedure is adopted:

a. the filaments or wires W and the fiber F are at first inserted in the grooves 6–9 and in the central duct 5 of the mandrel 2, respectively, and the sleeve 30 is placed around the mandrel 2;

b. the fiber F and the filaments W are drawn for a certain length through the hole 19 of the die 18, the latter already having been applied in abutting relationship on the frusto-conical end of the mandrel 2 when, as in the example of FIG. 1, said die 18 does not constitute a single piece with the mandrel 2;

c. steps are then taken to pass the filaments W and the fiber F through the hole 23 of the element 20 and the latter is applied on the die 18 in abutting relationship.

When the above cited steps are completed, the mandrel 2 is surrounded by the housing 51 which connects the channels 14–17, the flow apertures 25 and the space 24 between the die 18 and the element 20 to the feeding tank (not shown) by way of the duct 50.

It is evident that the housing for the mandrel 2 can be of any conventional type without departing from the scope of the invention. For example, provision can be made of sectors 31 (FIGS. 1 and 2) welded on the mandrel 2 in the space between the grooves 6–9 and intended to be tightened between adjustable jaws (not shown) for fastening the whole structure to a base.

In operation, the fiber F and the wires W are pulled out of the element 20 as the plastic material is extruded therebetween and thereover, the plastic material flowing therebetween by way of the channels 14–17 and flowing thereover by way of the apertures 25 and the space 24. The wires W and the fibers F are held in proper spaced relationship by the grooves 6–9, the sleeve 30 and the ducts 5 and 19 during the flow of the material therebetween and an outer layer of the material is applied thereover as they pass from the die 18 to the element 20. Due to the tension on the fibers F and the wires W and the paths which the wires W are forced to follow by the grooves 6–9, the sleeve 30 and the duct 19, a constant spacing is maintained between the fibers F and the wires W during the extrusion and solidification of the plastic material, thereby providing a cable with a constant spacing between the optical and metal elements.

If an outer covering layer is not desired, the apertures 25 may be omitted or blocked, and the element 20 may be omitted or retained.

For clarification of the above, and in order to better illustrate the features and objects of the invention, the use of the extrusion head to embed only two filaments in plastic material at strictly constant spacing will be described hereinafter with reference to FIG. 4 and on the basis of the same working principles indicated hereinbefore.

The extrusion head, in this case, comprises a mandrel 32, a conical die 33 having a circular flange 34 and an inner surface 42 intended to receive the mandrel end, an element 35 having a cavity 36 appropriately flared to receive the die 33 and with a supporting base with circular seat 37, on which the flange 34 of the die 33 abuts.

In this embodiment, the mandrel 32 also comprises a first cylindrical portion 38 followed by a second portion 39 substantially frusto-conical but, in any event, converging towards its end. The means for guiding the filaments W comprises two grooves 40 and 41 which are parallel in the first portion 38 of the mandrel 32 and converge in its second portion 39 so that the curvature determined by the mandrel configuration produces components of force on the wires or filaments W which compel them to travel closely adherent to the race of the grooves 40 and 41.

The conical die 33 comprises, in turn, an inner surface which has a conical first portion 42 and a second duct portion 43 with parallel walls. Consequently, the wires W exiting from the mandrel 32 and in contact with the die 33, owing to the curvature of the path followed in their passage from the portion 42 to the portion 43, are subjected to force components which maintain them at pre-established distances.

As said distance between the wires W must not be altered by the flow of the plastic material, the means which regulate said flow comprises, on the mandrel 32, two convergent portions 44 and 45 between the grooves 40 and 41, and, on the die flange 34, two separate ducts 46 and 47 for the further admission of plastic material in the space between the die 33 and the element 35 which covers the filaments W from the central duct 43 of the die 33.

With respect to the assembling of the various parts of the extruder head shown in FIG. 4, the same procedures described for the embodiment of FIGS. 1–3 are followed, so that, for the sake of simplicity, no further explanation will be given in this respect.

As is clear from the description hereinbefore, the extrusion head according to the invention does not involve any particular construction difficulties, as it is constituted by elements which can be easily processed with conventional machine tools.

In particular, said extrusion head offers the advantage of being particularly suitable for embedding any type of filaments having a modulus of elasticity higher than 4,000 kg/mm² and any arrangement.

The main advantage of the extrusion head according to the invention consists in the possibility of having filaments spaced apart at constant distances. In fact, the filaments, subjected to mechanical tension forces, are guided at first from a cylindrical portion towards a frusto-conical portion along the mandrel, and then, along a conical surface, such as that of the die, they are directed towards a portion again having parallel walls, such as those of the central duct of the same die.

Therefore, it can be easily understood that, during the passage between the two portions of the mandrel, components of force are produced towards the mandrel center, the effect of which is that of maintaining the filaments in the races of the grooves. In the passage from the conical surface of the die to the parallel walled portion, which produces deflections opposite to that connecting the two portions of the mandrel, components of force of opposite sense are produced which are such as to maintain the filaments in close adherence to the inner surface of the central duct of the die.

It follows that the components of force produced by the geometry of the mandrel and of the die are able to maintain the filaments in pre-established planes and directions.

On the other hand, the system for causing the flow of plastomeric material permits advantageously the holding of the filaments in a fixed mutual position.

For example, in the extrusion head of FIGS. 1–3, intended for embedding the fiber F and the filaments W, the plastic material, being obliged to flow between the walls 10–13 of the channels 14–17 and at a lever lower (see FIG. 2) than that of the grooves 6–9 in which the filaments W travel, is compelled to flow out from the mandrel 2 between the filaments W themselves and towards the optical fiber F, and then to pass through the hole 19 of the die 18.

The obtained product, namely, a plastic support having its contour determined by the dimensions of the hole 19 of the die 18 and having filaments W embedded therein at its periphery and a fiber F at its center, is advantageously finished, as stated hereinbefore, in its passage through the conical element 20 because of the additional application of plastic material.

Still more particularly, the extrusion head according to the invention is especially suitable to carry out a process for the extrusion of plastomeric or elastomeric material around filaments of the already cited type, which process compises the steps of causing the filaments to advance along the mandrel, applying forces in order to maintain the filaments in contact with the mandrel along pre-established planes, applying further forces to the filaments exiting from the mandrel to direct them along pre-established directions, and admitting plastic material between the filaments.

Said process can be carried out with synthetic thermoplastic material, such as, for example, polyolefines, polyamides, polyesters, or with elastomeric material.

It can be understood, moreover, that the extrusion head according to the invention can be used for carrying out an extrusion process for covering filaments comprising, besides the already cited steps, in which plastic material is extruded around the filaments exiting from the mandrel, a subsequent step in which further plastic material is extruded around the already extruded outer layer.

In fact, as already mentioned in relation to the extrusion head shown in FIGS. 1–3, the filaments W and the glass fiber F exiting from the mandrel 2 pass through the hole 19 of the die 18 and remain embedded in the plastic material coming from the channels 14–17.

In a subsequent step, as appears from the particular description of the extrusion head illustrated in the drawings, said first extruded layer, comprising the filaments W, passes through the hole 23 of the element 20 and is covered there with a further plastic layer coming through the space 24 created by the coupling of the conical surfaces of the die 18 and of the element 20.

It is evident that said further covering of plastic material is advantageous for the final product, because it ensures an additional securing material on the first layer, with a greater guarantee that the distance between the filaments and the fibers is maintained.

It will be understood by those skilled in the art that further modifications based on the principles of the invention may be made. In particular, it is clear that other embodiments involving a mandrel having a geometrical shape different from that illustrated and described, as well as parts able to guide the filaments W exiting from the mandrel, which are different from the die 18, may be used. Obviously, such alternative embodiments must respect the principle of the invention, that is, maintenance of the filaments in pre-established planes, as is possible by forcing the filaments W to contact surfaces of the extrusion head at which the tension force on the filaments W include components in said planes.

We claim:

1. An extrusion head for extruding plastomeric or elastomeric material on at least two filaments of relatively high modulus of elasticity comprising a mandrel having a surface provided with a plurality of guiding means, one for each filament for engaging each of said filaments and maintaining them in spaced relation while they are drawn across said mandrel and having material directing means intermediate said guiding means for receiving said material and directing it between said guiding means, said mandrel having a forward end at one end of said guiding means and a rearward end at the other end of said guiding means and said surface of said mandrel has a first cylindrical portion extending from said rearward end toward said forward end and a second portion intermediate said first portion and said forward end, said second portion tapering and decreasing from said first portion to said forward end and from the transverse dimensions of said first portion to smaller transverse dimensions, said guiding means following said surface and thereby guiding each of said filaments along a first path parallel to said first portion of said surface and then along a second path parallel to said second portion of said surface, said extrusion head further comprising a die at said forward end of said mandrel, said die having a central duct and an opening extending from said duct to said second portion of said mandrel, said opening being defined by a conical wall co-axial with said second portion and spaced, at least in part, from said second portion to define a space between sid conical wall and said second portion for the passage of said material between said conical wall and said second portion into said central duct, said central duct being in communication with said guiding means.

2. An extrusion head as set forth in claim 1, wherein said mandrel has grooves therein which form said guiding means, said grooves extending from said rearward end to said forward end, being equidistant peripherally of said mandrel and having a transverse dimension substantially equal to the cross-sectional dimension of said filaments and wherein said mandrel has channels therein forming said material directing means, said channels extending from said forward end toward said rearward end, at least a portion of each of said channels at said forward end being spaced from the center of a transverse section at said forward end by a distance less than the spacing of said grooves from said center at said forward end.

3. An extrusion head as set forth in claim 1, wherein said first portion is cylindrical and said second portion is frusto-conical.

4. An extrusion head as set forth in claim 1, wherein said second portion has a plurality of radially extending walls thereon equal in number to the number of said filaments, said walls extending from said forward end to said first portion and each of said walls having a groove therein extending from said forward end at least to said first portion, each said groove forming part of said guiding means, and said second portion having a plurality of channels, one between each pair of said walls, forming said material directing means, said channels extending from said forward end to said first portion.

5. An extrusion head as set forth in claim 4, wherein each said groove extends from said forward end to said rearward end and along said first portion and further comprising a sleeve having an inner diameter substantially equal to the outer diameter of said first portion around said first portion.

6. An extrusion head as set forth in claim 4, wherein said mandrel has a central duct therein for the passage of a further filament intermediate said guiding means, said last-mentioned duct extending from said rearward end to said forward end.

7. An extrusion head as set forth in claim 1, further comprising a shaping element at the side of said die remote from said mandrel, said element having a central opening of a size greater than the size of said duct in said die and being defined by substantially parallel walls and having a further opening extending from said central opening thereof to around at least a portion of the outer surface of said die, said further opening being defined by a conical wall which increases in size in the direction from said central opening in said element to said die, said last-mentioned conical wall being spaced, at least in part, from said outer surface of said die to define a space between said last-mentioned conical wall and said outer surface of said die for the passage of said material between said last-mentioned conical wall and said outer surface of said die and into said central opening of said element.

8. An extrusion head as set forth in claim 7, wherein said die comprises an outer circular flange with a circular seat and said element has a circular seat thereon engageable with said circular seat on said flange.

9. An extrusion head as set forth in claim 8, wherein said flange has apertures therethrough communicating with said space between said last-mentioned conical wall and said outer surface of said die for the supply of said material to said last-mentioned space.

* * * * *